Nov. 1, 1960 H. MOONS 2,958,615
METHOD OF BARING ELECTRIC RIBBON CABLES
Filed Aug. 18, 1959 2 Sheets-Sheet 1

Inventor
H. MOONS
By
Robert Harding Jr.
Attorney

Nov. 1, 1960  H. MOONS  2,958,615
METHOD OF BARING ELECTRIC RIBBON CABLES
Filed Aug. 18, 1959  2 Sheets-Sheet 2
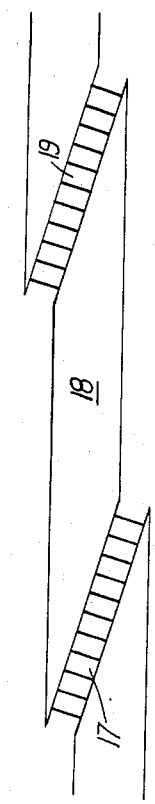
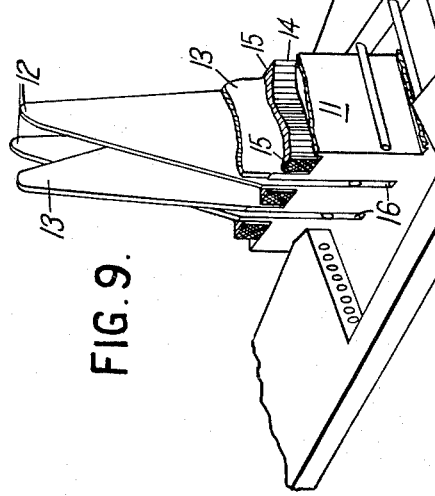
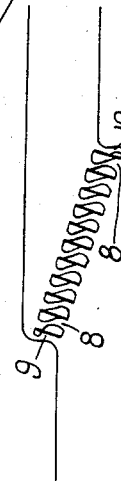
Inventor
H. MOONS
By
Attorney

United States Patent Office 2,958,615
Patented Nov. 1, 1960

2,958,615

METHOD OF BARING ELECTRIC RIBBON CABLES

Hugo Moons, Antwerp, Belgium, assignor to International Standard Electric Corporation, New York, N.Y., a corporation of Delaware Filed Aug. 18, 1959, Ser. No. 834,498

Claims priority, application Netherlands Sept. 12, 1958

5 Claims. (Cl. 134—9)

The present invention relates to a method of baring, at desired places, electric ribbon cables in which the conductors are embedded in thermoplastic insulating material in a single plane.

Multi-wire electric ribbon cables may be used in multiple wiring of selector banks in automatic telephone exchanges. As known in the art they therefore have to be provided with uninsulated portions.

The manufacture of such cables is described in the British Patent No. 678,042 and methods are also mentioned therein for providing uninsulated parts on these cables.

More especially it is claimed in this patent that, when an electric ribbon cable is produced in a single extruding operation, the removal of insulation at desired points is effected by a cutting and crushing operation. More details about this operation are however not given.

An object of the present invention is to provide a simple method for removing the insulation at predetermined places of such cables.

In accordance with a first characteristic of the invention a method and arrangement for baring electric ribbon cables comprises the use of a press including two movable vertical and heated clamping plates mounted one on top of the other, and normally spaced from one another, so that upon said plates being made to press on opposite sides of a part of said ribbon cable, the insulating material covering the conductors and coming into contact with said heated clamping plates is softened, and introduced between said conductors which are thus bared, comprises also means for more fully disengaging said insulating material from said conductors and further comprises mean for eliminating the thus disengaged insulating material.

In accordance with another characteristic of the invention, a method and arrangement is characterised by the fact that the pressure is exerted along a thin strip, cutting across the width of said cable, in a direction making an acute angle with the direction of the conductors, that said means are constituted by a first and second pair of jaws, that the ribbon cable is gripped on one side of said zone bewteen said first pair of jaws and gripped on the other side of said zone between said second pair of jaws, so that, when a translation movement is imparted to the portion of the cable gripped by said second pair of jaws and in a direction such as to increase both the acute angle α and the spacing between these slightly bared conductors, the pieces of insulating material which have been introduced between said bared conductors are now aligned substantially along one diagonal of each parallelogram comprised between two adjacent conductors so that said pieces of insulating material are fully disengaged from said conductors in the angles of each parallelogram on opposite sides of said one diagonal.

The above and other objects and characteristics of the invention will become more apparent and the invention itself will be best understood by referring to the following description of an embodiment taken in conjunction with the accompanying drawings in which:

Fig. 1 indicates schematically the cross-sectional appearance of a ribbon cable comprising a plurality of co-planar conductors embedded in insulating material.

Figure 5:
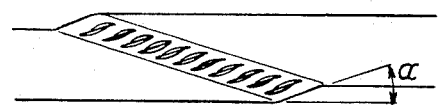
Figures 6, 7:
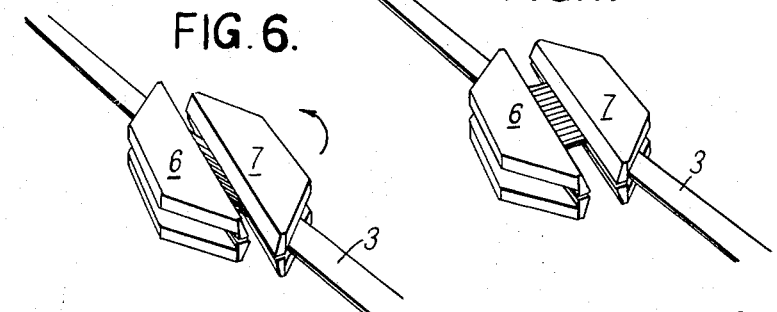

Fig. 5 indicates the appearance of the cable obtained after this first step;

Fig. 6 illustrates a rotating arrangement during the second step of the manufacturing method;

Fig. 7 shows the rotating arrangement after this second step;

Fig. 8 indicates the appearance of the cable obtained after this second step;

Fig. 9 represents on an enlarged scale a comb positioning arrangement for enabling the third step of the manufacturing method to be carried out;

Fig. 10 indicates the final appearance of the cable obtained after this third step.

Figure 1:
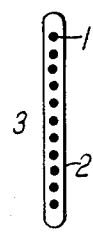
Figure 2:
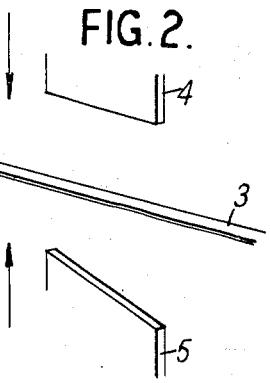
Fig. 2 illustrates a press arrangement prior to the first step of the manufacturing method according to the invention.
Figure 3:
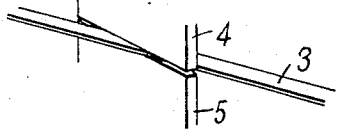
Fig. 3 represents the press arrangement during this first step.
Figure 4:
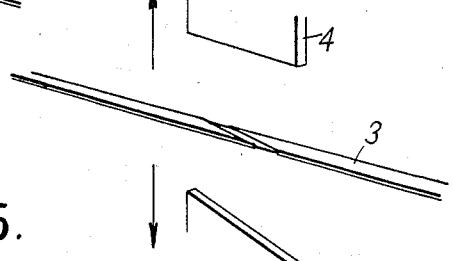
Fig. 4 shows the press arrangement after this first step.

A ribbon cable upon which the method of the present invention is applied is shown on Fig. 1. This cable 3 comprises a plurality of conductors 1 e.g. with a diameter of 0.04 cm. which are arranged in spaced parallel relationship in one plane and which are enclosed in a homogeneous mass of thermoplastic material 2 such as plasticized polyvinyl chloride, hereinafter referred to as P.V.C. e.g. type D. The thickness of the cable is comprised between 0.117 cm. and 0.125 cm.

Fig. 10 indicates what is intended and shows the insulation removed from the conductors over the small parallelograms 17, 19 while it is retained over the large parallelogram 18.

It will be now assumed that the ribbon cable 3 is fed at a conctant speed between the two heated clamping plates 4 and 5 of a press (not shown) and that it is stopped at regular intervals. At the moment the cable is stopped, the heated clamping plates 4 and 5 which are mounted one on top of the other in a vertical plane that is oblique with respect to the direction of the cable, are moved towards each other.

The cable is thus gripped by the press and due to the exerted pressure and the applied heat, which have both to be empirically regulated, e.g. 150 kg./cm.$^2$ and 100° C. for the type D given above, the P.V.C. covering the conductors is softened and forced inside between the thus bared conductors. The temperature of the heated clamping plates 4 and 5 should be watched for preventing the P.V.C. from sticking to these plates.

During this first step the bared conductors undergo a slight angular displacement α such as is to be seen on Fig. 5 when the parts 4 and 5 have been removed. This displacement has been noted experimentally and a possible explanation is that the mass of P.V.C. outside the actual plane of the conductors is forced by heat and pressure in that plane, and due to the reduced thickness of this mass it forces the conductors apart. Then, to allow such increased separation between the conductors, the latter are actually bent, in the common plane of the conductors, in a direction tending to increase by α the acute angle between the conductors and the oblique line along which the pressure is exerted. Due to the P.V.C. being somewhat stretched and as it cools down it retracts slightly leaving the conductors already slightly disengaged.

The so obtained cable is then gripped on the left and the right side of the bared conductors between the pairs of jaws 6 and 7 (Fig. 6) respectively. A translation movement in the direction shown is then given by a suitable mechanism (not shown) to the pair of jaws 7 till it reaches the position shown on Fig. 7. Thus, while the jaws 6 remain fixed, a translation movement is imparted to the portion of the cable gripped by 7 and in such a direction as to increase the angle α. Due to this translation movement the bared conductors can be aligned perpendicularly to the inside edges of the pairs of jaws (α=90°) and the P.V.C. parts, between these conductors now form the diagonals of the rectangles constituted by pairs of adjacent conductors, the outside P.V.C. parts 9 and 10 excepted. Thus, a maximum separation between adjacent conductors has now been secured, and a clear separation has been obtained between the P.V.C. parts and the conductors. The latter fact is of great importance since these P.V.C. parts have to be eliminated from between these conductors by an ultimate operation which will consist in cutting these P.V.C. parts.

Therefore a comb positioning arrangement 11 (Fig. 9) constituted by a series of upstanding triangular parts, such as 12 and 13 is used.

Pieces 14, provided with cutting edges 15, and grooves 16 have alternately been provided between these triangular parts.

The cable, shown in Fig. 8, is now placed upon the comb in such a manner that of two adjacent upstanding parts 12 and 13, the part 12 is introduced in the angle of a rectangle, formed by two adjacent bared conductors, which is not occupied by the P.V.C., while the part 14 is introduced in the opposite angle of the same rectangle. The cable is then manually pushed down till the P.V.C. parts come to rest on the cutting parts 14 and each of the bared conductors is thus automatically engaged in a groove.

A press (not shown) has been provided so that, when a pressure is exerted by it on the free ends of the cable, i.e. on each side of the comb and on the conductors situated within the grooves, the P.V.C. diagonals resting on the cutting parts 14 are cut by the edges 15 of these pieces while the bared conductors are pushed downward in the grooves.

The thus obtained cable is shown on Fig. 10.

The succession in time of the above described operations which are successively executed by means of a press, a rotating arrangement and a comb positioning arrangement cannot of course be changed, but although this press and these arrangements may normally be mounted one after another it is clear that e.g. each of the pairs of jaws, constituting the rotating arrangement, may be mounted next to the heated press and on each side of the latter.

While the principles of the invention have been described above in connection with specific apparatus, it is to be clearly understood that this description is made only by way of example and not as a limitation on the scope of the invention.

What is claimed is:

1. A method for baring the wires in a plastic coated electric ribbon cable which comprises the steps of simultaneously heating the cable to a temperature sufficient to soften the plastic and compressing the cable in a transverse area, gripping the cable at each end of said transverse area, displacing the cable at the ends of the transverse area in the plane of the cable whereby the plastic material between the wires of the cable is separated from the wires and severing the plastic material at the ends of the transverse area whereby the plastic material is removed from between the individual wires.

2. A method for baring the wires as in claim 1, wherein the heating and compressing step is carried on at a compression and temperature approximately equal to 150 kg./cm.$^2$ and 100° C.

3. A method for baring the wires in a plastic coated electric ribbon cable which comprises the steps of simultaneously heating to a temperature sufficient to soften the plastic material and compressing spaced portions of the cable in a longitudinal direction, gripping the cable at each end of said spaced portions, displacing the cable at the ends of said portions in the plane of the cable whereby the plastic material between the wires of the cable is separated from the wires and severing the plastic material at the ends of said portions whereby the plastic material is removed from between the individual wires.

4. A method for baring the wires in a plastic coated electric ribbon cable which comprises the steps of simultaneously successively heating to a temperature sufficient to soften the plastic material and compressing spaced portions of the cable in a longitudinal direction, successively gripping the cable at each end of said spaced portions, successively displacing the cable at the ends of said portions in the plane of the cable whereby the plastic material between the wires of the cable is separated from the wires and successively severing the plastic material at the ends of said portions whereby the plastic material is removed from between the individual wires.

5. A method for baring the wires as in claim 4 in which the steps of displacing the cable at the ends of spaced portions such that the angle between the wires in the compressed area and the axis of the cable approaches 90°.

References Cited in the file of this patent

UNITED STATES PATENTS

| 2,432,868 | Earl | Dec. 16, 1947 |
| 2,731,372 | Kirsch | Jan. 17, 1956 |
| 2,882,188 | Levin | Apr. 14, 1959 |